United States Patent
Jiang et al.

(10) Patent No.: US 10,052,668 B1
(45) Date of Patent: Aug. 21, 2018

(54) PROCESS FOR TREATING WASTE FROM A PITHEAD POWER PLANT AND FOR SEQUESTRATING CARBON DIOXIDE DISCHARGED THEREFROM

(71) Applicant: Tsinghua University, Beijing (CN)

(72) Inventors: Peixue Jiang, Beijing (CN); Ruina Xu, Beijing (CN); Di He, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 15/689,980

(22) Filed: Aug. 29, 2017

(30) Foreign Application Priority Data

Apr. 26, 2017 (CN) .......................... 2017 1 0280423

(51) Int. Cl.
| | | |
|---|---|---|
| *B09B 1/00* | (2006.01) | |
| *E21B 41/00* | (2006.01) | |
| *B65G 5/00* | (2006.01) | |
| *B09B 3/00* | (2006.01) | |
| *C04B 40/02* | (2006.01) | |

(52) U.S. Cl.
CPC ............ *B09B 1/008* (2013.01); *B09B 3/0041* (2013.01); *B65G 5/005* (2013.01); *C04B 40/0231* (2013.01); *E21B 41/0064* (2013.01)

(58) Field of Classification Search
CPC ... C04B 40/0231; B09B 1/008; B09B 3/0041; Y02W 30/92; Y02W 30/93; E21B 41/0057; E21F 15/00; E21F 15/005
See application file for complete search history.

(56) References Cited

U.S. PATENT DOCUMENTS

| | | | | |
|---|---|---|---|---|
| 4,448,252 A | * | 5/1984 | Stoddard ............... | E21B 33/138 166/258 |
| 4,463,807 A | * | 8/1984 | Stoddard ............... | E21B 33/138 166/241.1 |
| H4584 | * | 8/1996 | Moore ........................... | 588/250 |
| 9,790,703 B1 | * | 10/2017 | Hector, Jr. ................ | E04H 9/04 |
| 2004/0118323 A1 | * | 6/2004 | Oates ........................ | C04B 7/28 106/763 |
| 2006/0185560 A1 | * | 8/2006 | Ramme .................. | B01D 53/62 106/672 |
| 2013/0104779 A1 | * | 5/2013 | Al-Mehthel ............ | C04B 28/04 106/709 |
| 2014/0116295 A1 | * | 5/2014 | Niven ..................... | C04B 28/02 106/638 |
| 2014/0197563 A1 | * | 7/2014 | Niven ..................... | B01D 53/62 264/69 |
| 2014/0261089 A1 | * | 9/2014 | Bisque .................. | C04B 18/021 106/666 |
| 2015/0232381 A1 | * | 8/2015 | Niven ....................... | C04B 7/26 106/709 |
| 2017/0044898 A1 | * | 2/2017 | Hassani ................ | E21F 15/005 |
| 2018/0050965 A1 | * | 2/2018 | Hector, Jr. .......... | C04B 40/0071 |

* cited by examiner

*Primary Examiner* — Carib A Oquendo
(74) *Attorney, Agent, or Firm* — Knobbe, Martens, Olson & Bear, LLP

(57) ABSTRACT

A process for treating waste from a pithead power plant and sequestrating carbon dioxide discharged therefrom is provided. A mixed material of solid waste from the power plant, cement and a mixing liquid is filled into a depleted coal mine and compacted. A hydrating liquid is then injected into the filler after compaction to cause hydration. After that, carbon dioxide discharged from the power plant is injected to mineralize the carbon dioxide, thereby achieving carbon dioxide sequestration and reinforcement of the depleted coal mine. The invention utilizes abundant basic oxides present in the solid waste, and the fact that calcium hydroxide and tobermorite present in the hydrated cement chemically react with the injected carbon dioxide to produce stable carbonates in solid, and thus simultaneously achieves carbon dioxide sequestration, treatment of solid waste, and reinforcement of a depleted coal mine.

14 Claims, 2 Drawing Sheets

PROCESS FOR TREATING WASTE FROM A PITHEAD POWER PLANT AND FOR SEQUESTRATING CARBON DIOXIDE DISCHARGED THEREFROM

This application claims priority to Chinese application number 201710280423.7, filed Apr. 26, 2017, with a title of PROCESS FOR TREATING WASTE FROM A PITHEAD POWER PLANT AND FOR SEQUESTRATING CARBON DIOXIDE DISCHARGED THEREFROM. The above-mentioned patent application is incorporated herein by reference in its entirety.

TECHNICAL FIELD

The present invention relates to the field of industrial waste treatment, and in particular to a process for treating waste from a pithead power plant and for sequestrating carbon dioxide discharged therefrom.

BACKGROUND

In recent years, human activities and industrial civilizations have brought enormous material wealth to the society, but they have also led to excessive consumption of natural resources and energy. The melting of glaciers and thus the rise in ocean levels as a result of global warming have become a global issue. Countries worldwide have united actively and are engaging in seeking solutions to lessen the tendency of the global warming. The Conference of Parties to the United Nations Framework Convention on Climate Change concluded successfully on 12 Dec. 2015 in Paris, France. 195 Parties adopted the Paris Agreement, which is a historic new agreement on climate change. A Large emission amount of carbon dioxide is the greatest root cause of the global warming, and combustion of coal to generate power is a major source of carbon dioxide emission. Currently, most coal-fired power plants discharge carbon dioxide directly into the atmosphere without any treatment. Only a small number of power plants perform capture and separation for the discharged carbon dioxide, which is then transported through pipes to a subsurface formation suitable for carbon dioxide sequestration, such as a depleted oil field, a deep saline aquifer or an unworkable seam, for long term sequestration or for oil and natural gas production. However, these methods are actually limited by geographic areas. There is no formation suitable for carbon dioxide sequestration or natural hydrocarbon reservoir near many power plants. In this case, if the discharged carbon dioxide is transported long distances by pipelines to a site suitable for sequestration or oil and natural gas production, investment costs would be substantially increased, and there would be a risk of leakage of the carbon dioxide from the pipelines.

The coal-fired power plants may produce lots of solid waste such as slag and ash. Taking Huaibei power plant as an example, its load is 4*200 MW, an annual volume of ash production is 730 thousand tons, and an annual volume of slag production 81 thousand tons. Currently, the slag and the ash are directly discharged as solid waste by most of the power plants. Discharge and storage of the solid waste may cause a serious environmental problem and a pressure on the society. Firstly, a lot of land may be taken by stacking a number of the discharged slag and ash. For this, cultivated area of local residents may be substantially decreased, and stacks of the discharged slag and ash may generate a great amount of dust which can seriously contaminate the air environment and affect normal life of the local residents. Further, under the action of rain, the slag and the ash stacked may flow into local rivers and lakes, and infiltrate into underground. This may cause contamination of local irrigation water and drinking water, thereby seriously affecting the health of the local residents. A lot of coal gangue which can not be recycled is produced during the process of coal mining for some pithead power plants, and the land and water resources may also be seriously contaminated by stacking a number of the coal gangue.

After coal mining is finished, the underground coal mine becomes a depleted one. Due to removal of a lot of coal, the depleted coal mine becomes a huge cavity. Support for the ground is thus absent, and problems such as cracking or collapse of the ground, landslide, debris-flow, and water and soil loss could be caused under a long time of seepage of rainwater. The surrounding air and hydrologic environment could also be seriously destroyed accordingly, and life safety and property safety of the local residents could be under serious threat.

SUMMARY

It is an objective of the present invention to provide a process for treating waste from a pithead power plant and sequestrating carbon dioxide discharged therefrom, which allows simultaneous achievement of carbon dioxide sequestration, treatment of solid waste and reinforcement of a depleted coal mine.

The present invention provides a process for treating waste from a pithead power plant and sequestrating carbon dioxide discharged therefrom, comprising steps of:

(A) mixing solid waste from the pithead power plant with cement and a mixing liquid to produce a mixed material;

(B) filling the mixed material produced in step (A) into a depleted coal mine and performing a compaction operation;

(C) injecting a hydrating liquid into the filler after compaction to cause hydration; and (D) injecting carbon dioxide discharged from the pithead power plant into the filler after hydration and then closing the mine to mineralize the carbon dioxide, thereby achieving carbon dioxide sequestration and reinforcement of the depleted coal mine.

Preferably, the solid waste in said step (A) comprises one or more of slag, ash, coal gangue, and architectural waste.

preferably, in said step (A), a mass ratio of the solid waste to the cement is 3/1 to 2.

preferably, in said step (A), a water-cement ratio of the mixed material is 0.2 to 0.25.

Preferably, a compaction pressure as used in said step (B) is 30 to 50 MPa.

Preferably, a porosity of the filler after compaction in said step (B) is 0.3 to 0.45.

Preferably, an injection amount of the hydrating liquid in said step (C) is 40% to 60% of a pore volume of the filler.

Preferably, a hydrating time in said step (C) is 25 to 35 days.

Preferably, in said step (D), the carbon dioxide is injected under a constant pressure.

Preferably, in said step (D), the carbon dioxide is reinjected every 3 to 5 years during the mine closure.

The present invention provides a process for treating waste from a pithead power plant and sequestrating carbon dioxide discharged therefrom, comprising steps of: mixing solid waste from the pithead power plant with cement and a mixing liquid to produce a mixed material; then filling the mixed material produced into a depleted coal mine and performing a compaction operation; injecting a hydrating liquid into the filler after compaction to cause hydration; and injecting carbon dioxide discharged from the pithead power plant into the filler after hydration and then closing the mine to mineralize the carbon dioxide, thereby achieving carbon dioxide sequestration and reinforcement of the depleted coal mine. The present invention utilizes abundant basic oxides present in the solid waste from the power plant, and the fact that calcium hydroxide and tobermorite present in the hydrated cement chemically react with the injected carbon dioxide to produce stable carbonates in solid, and thus simultaneously achieves carbon dioxide sequestration, treatment of solid waste, and reinforcement of a depleted coal mine. Theoretical calculations have indicated that, by using the process according to the present invention, the sequestration amount of the carbon dioxide can be up to 406.2 $kg/m^3$. Experimental results have shown that the strength of a simulated formation obtained can be up to 20 to 30 MPa.

DETAILED DESCRIPTION

Figure 1:
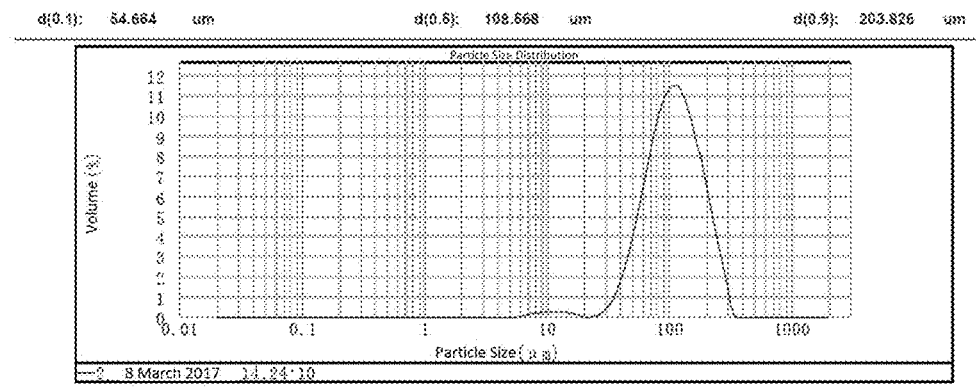
FIG. 1 is a diagram illustrating particle size distribution of slag in example 1.

The present invention provides a process for treating waste from a pithead power plant and sequestrating carbon dioxide discharged therefrom. The process includes steps of:

(A) mixing solid waste from the pithead power plant with cement and a mixing liquid to produce a mixed material;

(B) filling the mixed material produced in step (A) into a depleted coal mine and performing a compaction operation;

(C) injecting a hydrating liquid into the filler after compaction to cause hydration; and (D) injecting carbon dioxide discharged from the pithead power plant into the filler after hydration and closing the mine to mineralize the carbon dioxide, thereby achieving carbon dioxide sequestration and reinforcement of the depleted coal mine.

According to the present invention, the solid waste from the pithead power plant is mixed with cement and a mixing liquid to produce a mixed material. A mass ratio of the solid waste to the cement is preferably 3/1 to 2, more preferably 3/1.2 to 1.8, and most preferably 3/1.4 to 1.6. A water-cement ratio of the mixed material is preferably 0.2 to 0.25, more preferably 0.21 to 0.24, and most preferably 0.22 to 0.23. According to the invention, the water-cement ratio is controlled to be in a lower range, such that the mixed material is in a wet and solid state and thus not easily flowable. This facilitates transport and construction on one hand, and ensures a greater porosity to improve the permeation rate and thus facilitate injection of the carbon dioxide on the other hand.

According to the present invention, the solid waste may preferably comprise one or more of slag, ash, coal gangue and architectural waste. Each of the slag, the coal gangue and the ash contains abundant basic oxides (such as CaO and MgO). Main components of the architectural waste are calcium hydroxide and tobermorite (C—S—H). All of these can chemically react with the injected carbon dioxide to produce stable carbonates in solid.

The type of the cement to be employed in the invention is not specifically defined, and any type of cement well known to those skilled in the art may be used. The cement as used in the present invention is preferably portland cement. The cement, as a binder, can increase the strength of the solid mixture to meet the requirement for supporting the ground, and the cement after hydration can react with the carbon dioxide, thereby to adsorb and solidify more carbon dioxide and to thus improve the amount of the sequestrated carbon dioxide. In addition, the cement is an environment-friendly inorganic binder, and is also cheap in price.

According to the present invention, the mixing liquid preferably comprises water or an aqueous phase solution, more preferably an aqueous alkaline solution. The mixing liquid as used in the present invention may particularly be an aqueous alkaline solution discharged near the pithead power plant. The aqueous alkaline solution can further adsorb the carbon dioxide and increase the amount of the sequestrated carbon dioxide.

In order to increase a specific surface area of the solid waste and to facilitate construction, use of the solid waste from the pithead power plant after it is crushed is preferred. A particle size of the crushed slag is preferably 20 to 200 μm, more preferably 50 to 150 μm, and most preferably 80 to 120 μm. A particle size of the crushed coal gangue is preferably 1 to 10 cm, more preferably 3 to 8 cm, and most preferably 4 to 6 cm. A particle size of the crushed architectural waste is preferably 1 to 10 mm, more preferably 3 to 8 mm, and most preferably 4 to 6 mm.

Steps of the mixing process are not specifically defined herein, and any technical solution for preparing a mixed material well known to those skilled in the art may be available. According to the invention, when the solid waste from the pithead power plant comprises more of the slag, the ash, the coal gangue and the architectural waste, preferably, these different types of solid waste are mixed with the cement separately to produce a plurality of mixed materials according to the particle sizes of the solid waste. In one embodiment, specifically, the ash is mixed with the cement to produce an outer material, and the slag, the coal gangue and the architectural waste are mixed with the cement to produce an inner material.

According to the invention, after production of the mixed material, the mixed material is filled into a depleted coal mine and a compaction operation is then performed. A compaction pressure as used in the compaction operation is preferably 30 to 50 MPa, more preferably 35 to 45 MPa and most preferably 37 to 40 MPa. A porosity of the filler after compaction is preferably 0.3 to 0.45, more preferably 0.35 to 0.4. The compaction can ensure not only a necessary mechanical strength but also a sufficient porosity which can facilitate injection of the carbon dioxide and thus improve the total amount of the sequestrated carbon dioxide.

A pre-reinforcement process is preferably performed for the depleted coal mine before the backfill. Preferably and specifically, the pre-reinforcement process may be: arranging rebars and pouring a cement material onto the wall of the depleted coal mine to obtain a cement reinforcing layer. Operations for this process are not specifically defined herein, and any technical solution for pouring the cement material well known to those skilled in the art may be available. According to the present invention, the pouring is preferably performed in a direction from a mine mouth (i.e., the pithead) to a mine bottom.

Thickness of the cement reinforcing layer is not specifically defined herein, and can be adjusted according to the specific condition of the depleted coal mine. The thickness of the cement reinforcing layer is preferably 0.4 to 1 m, more preferably 0.5 to 0.8 m. The pre-reinforcement can make depressions in the wall of the depleted coal mine filled to reinforce the mine, thereby to prevent it from collapsing due to quakes as a result of a subsequent mechanical work and to thus ensure safety in working. Further, the set cement has a lower permeability and may serve as the last protecting layer which prevents the carbon dioxide from leaking out.

According to the present invention, the backfill is preferably performed in a direction from the mine bottom to the mine mouth. When the solid waste from the pithead power plant comprises more of the slag, the ash, the coal gangue and the architectural waste, preferably, the plurality of the mixed materials produced are filled into the depleted coal mine in layers simultaneously. In one embodiment, specifically, the outer material obtained by mixing the ash with the cement and the inner material obtained by mixing the slag, the coal gangue and the architectural waste with the cement are filled into the mine simultaneously in order from the outer to the inner. According to the invention, the ash has a smaller particle size. The outer material, after compaction, obtained by mixing the ash with the cement thus has a smaller porosity, thereby to further reduce leakage of the carbon dioxide and decrease the pressure in the cement reinforcing layer, providing a doubled security to prevent the carbon dioxide from leaking outward.

After completion of the compaction, a hydrating liquid is injected into the compacted filler to cause hydration. According to the invention, an injection amount of the hydrating liquid is preferably 40% to 60% of the pore volume of the filler, more preferably 45% to 55%, and most preferably 48% to 52%. According to the invention, the hydrating liquid preferably comprises water or an aqueous phase solution, more preferably an aqueous alkaline solution. The hydrating liquid as used in the present invention may particularly be an aqueous alkaline solution discharged near the pithead power plant. The aqueous alkaline solution can further adsorb the carbon dioxide and increase the amount of the sequestrated carbon dioxide.

According to the invention, the hydration time is preferably 25 to 35 days, more preferably 28 to 32 days. During the hydration, the cement as the binder adsorbs water and is then hardened, and compounds present in the solid waste are dissolved in the water to perform carbonation reactions with the carbon dioxide dissolved in the water.

After completion of the hydration, the carbon dioxide discharged from the pithead power plant is injected into the filler after hydration and the mine is then closed to mineralize the carbon dioxide, thereby achieving carbon dioxide sequestration and reinforcement of the depleted coal mine. In order to increase the amount of the sequestrated carbon dioxide, the carbon dioxide discharged from the pithead power plant before injection is preferably purified. The purification process of the present invention is not specifically defined herein, and any technical solution for purifying the carbon dioxide well known to those skilled in the art is available. According to the invention, preferably, the purified carbon dioxide has a purity of greater than 90%, more preferably greater than 95%. Preferably, the carbon dioxide is injected under a constant pressure into the filler. The constant pressure is preferably 11 to 14 MPa, more preferably 12 to 13 MPa. Preferably, the injection of the carbon dioxide is performed until it can not be further injected into the filler.

According to the invention, the total mine closing time is preferably not less than 30 years. The carbon dioxide is continuously consumed due to its continuous mineralization, causing its pressure to become less than the initial pressure. During an early stage of the mine closure, the carbon dioxide may be reinjected every 3 to 5 years, preferably 3.5 to 4.5 years. Preferably, when the total injection amount of the carbon dioxide reaches a theoretical sequestration value, the injection of the carbon dioxide is stopped and the coal mine is closed permanently. During the mine closure, the injected carbon dioxide chemically reacts with the cement firstly, and then penetrates and diffuses into the slag and the ash where the carbon dioxide reacts with basic oxides therein to produce carbonates, i.e., the carbon dioxide sequestration and the depleted coal mine reinforcement are realized by mineralization of the carbon dioxide.

To monitor variations in formation, preferably, monitoring devices are set in advance in the sequestration area. According to the invention, the monitoring devices preferably comprise a pressure detector, a temperature detector and a carbon dioxide concentration detector. Dynamic parameters associated with the formation can thus be known through the monitoring. The carbon dioxide can be injected once again when the formation pressure and concentration of the sequestrated carbon dioxide decreases due to dissolution and solidification of the sequestrated carbon dioxide.

The process for treating waste from a pithead power plant of the invention solves the problem of carbon dioxide emission. The carbon dioxide produced by burning coal may be directly injected into a depleted coal mine after purification for sequestration, thereby reducing the cost of transportation of the carbon dioxide over long distances. The process of the present invention also solves the problem of the stacking of the solid waste (i.e., slag, ash, coal gangue and architectural waste in the area surrounding the power plant) from the pithead power plant, thereby saving land resources, protecting local lakes and rivers as well as groundwater, reducing local air pollution and thus protecting the healthy life of the local residents. The process of the invention further solves problems of collapse of the depleted coal mine, and water and soil loss, thereby protecting farmland of the local residents and thus life and property safety of the local residents.

To further describe the present invention, the process for treating waste from a pithead power plant of the present invention will now be described in more detail with reference to examples, which should not be construed as limiting the scope of the invention.

EXAMPLE 1

A filling process would be performed for a 1.5 million tons per year coal mine which had a 20 years working life and was depleted, and had a subsurface hollow zone with a volume of about 22 million $m^3$.

Figure 2:
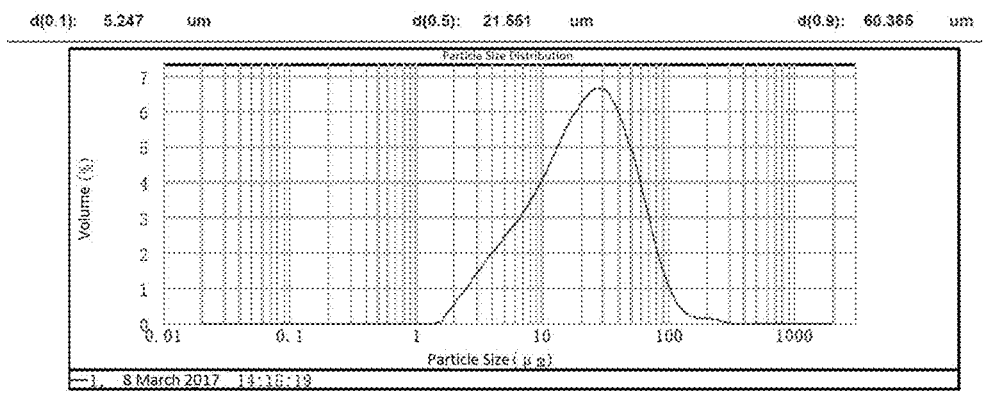
FIG. 2 is a diagram illustrating particle size distribution of cement in example 1.

(A) Slag, ordinary portland cement and water were mixed in a mass ratio of 3:2:1, and a mixed material was thus obtained. Compositions of the slag and the ordinary portland cement were shown in Table 1, and particle sizes thereof were shown in FIGS. 1 and 2, respectively.

(B) Arranging rebars and pouring a cement material onto the wall of the depleted coal mine in a direction from its mouth to its bottom, a volume of the poured cement was 10% of the total mine volume. The mixed material obtained in said step (A) was then filled into the depleted coal mine in a direction from the bottom to the mouth and compacted. A volume of the filling layer was 90% of the total mine volume. A compaction pressure and parameters associated with the filler after compaction were shown in Table 2.

(C) Water was injected into the filler after compaction, a pore filling rate reached 50%, and the hydration lasted for 28 days.

(D) Carbon dioxide (with a purity of 90%) was injected into the filler after hydration under a constant pressure of 13 MPa, and the coal mine was then closed to mineralize the carbon dioxide. Carbon dioxide sequestration and reinforcement of the depleted coal mine were thus realized. The carbon dioxide was reinjected every 3 years during the mine closure.

Parameters associated with a simulated formation in this example were shown in Table 3. A compressive strength of the simulated formation was 25 MPa.

A calculated total amount of the sequestrated carbon dioxide was 9.768 million tons. Details of the calculation were as follows.

(1) Calculation of a theoretical amount of the carbon dioxide sequestrated by the filling layer According to the above conditions, the theoretical amount of the carbon dioxide solidified by the solid waste filler was calculated based on a method proposed by Huntzinger. A formula as used herein was:

$$\%THCO_2 = 0.785(\%CaO - 0.56 \times \%CaCO_3 - 0.7 \times \%SO_3) + 1.091 \times \%MgO + 0.71 \times \%Na_2O + 0.468 (\%K_2O - 0.632 \times \%KCl)$$

According to the compositions of the cement and the slag shown in Table 1, theoretical amounts of the carbon dioxide solidified by the cement and the slag respectively were as follows:

for the cement:

$$C\_\%THCO_2 = 0.3773,$$

and for the slag:

$$A\_\%THCO_2 = 0.0411.$$

A total solidification amount of the carbon dioxide for the filler with a volume of 1 m³ would now be calculated. A water saturation of the filler was 0.4.

An amount of the carbon dioxide solidified by the cement was:

$$m_c = m_{cement} \times C\_\%THCO_2 = V \times \rho \times 0.4 \times C\_\%THCO_2 = 1 \times 1303.1 \times 0.4 \times 0.3773 = 196.66 \text{ kg}.$$

An amount of the carbon dioxide solidified by the slag was:

$$m_a = m_{ash} \times A\_\%THCO_2 = V \times \rho \times 0.6 \times A\_\%THCO_2 = 1 \times 1303.1 \times 0.6 \times 0.0411 = 32.13 \text{ kg}.$$

An amount of the carbon dioxide dissolved in the water was:

$$m_d = m_{water} \times w\% = V_{water} \times \rho_{water} \times w\% = V \times \epsilon \times S_w \times \rho_{water} \times w\% = 1 \times 0393 \times 0.4 \times 998.41 \times 0.0561 = 8.805 \text{ kg}.$$

An amount of the residual supercritical carbon dioxide was:

$$m_{sc} = V_{sc} \times \rho_{sc} = V \times \epsilon \times (1-S_w) \times \rho_{sc} = 1 \times 0.393 \times 0.6 \times 714.84 = 168.56 \text{ kg}.$$

Thus, the total solidification amount of the carbon dioxide for the 1 m³ solid waste filler was:

$$M_{CO_2} = m_c + m_a + m_d + m_{sc} = 196.66 + 32.13 + 8.805 + 168.56 = 406.155 \text{ kg/m}^3.$$

(2) Calculation of a theoretical amount of the carbon dioxide sequestrated by the first layer—the cement reinforcing layer It was assumed that the mass fraction of the cement in the cement reinforcing layer was 80% (rebars were excluded and its porosity was also omitted), and the density thereof was 2600 kg/m³.

Then, the total solidification amount of the carbon dioxide for a 1 m³ cement reinforcing layer was:

$$m_c = m_{cement} \times C\_\%THCO_2 = V \times \rho \times 0.8 \times C\_\%THCO_2 = 1 \times 2600 \times 0.8 \times 0.3773 = 784.8 \text{ kg}.$$

The total sequestration amount of the carbon dioxide was:

$$M = V \times M_{CO_2} = (2.2 \times 10^7 \times 0.9 \times 406.155 + 2.2 \times 10^7 \times 0.1 \times 784.8) \div 1000 = 9.768 \times 10^6 \text{ t}.$$

TABLE 1

| Compositions of slag and cement | | | | | | | | | |
|---|---|---|---|---|---|---|---|---|---|
| Composition % | CaO | MgO | Fe$_2$O$_3$ | Al$_2$O$_3$ | K$_2$O | Na$_2$O | MnO | SiO$_2$ | SO$_3^{2-}$ |
| Slag | 0.03164 | 0.006 | 0.03775 | 0.2412 | 0.0187 | 0.0033 | 0.00021 | 0.3198 | 0.00259 |
| Cement | 0.4416 | 0.0405 | 0.0314 | 0.1227 | 0.0103 | 0.00368 | 0.00256 | 0.2985 | 0.0382 |

TABLE 2

| Parameters associated with compaction | | | | | |
|---|---|---|---|---|---|
| Compaction Pressure/ MPa | Diameter/ cm | Height/ cm | Porosity | Density/ kg/m3 | Compressive Strength (after 28 days)/MPa |
| 36.7 | 2.54 | 5 | 0.393 | 1464.9 | 25.5 |

TABLE 3

| Parameters associated with simulated formation | | | | | |
|---|---|---|---|---|---|
| Formation Depth/m | Pressure/ MPa | Temperature/ °C. | CO$_2$ Density kg/m3 | Water Density kg/m3 | CO$_2$ Solubility (w %) |
| 1000 | 10 | 35 | 714.84 | 998.41 | 5.61 |

EXAMPLE 2

A filling process would be performed for a 1.5 million tons per year coal mine which had a 20 years working life and was depleted, and had a subsurface hollow zone with a volume of about 22 million m³.

(A) Ash, cement and water were mixed in a ratio of 1:1:0.5 to produce an outer material; slag, architectural waste and coal gangue were crushed into sizes of 80 to 120 μm, 4 to 6 mm, and 4 to 6 cm, respectively;

ordinary portland cement, slag, architectural waste, coal gangue and water were mixed in a mass ratio of 2:3:3:2:2.2 to produce an inner material.

Figure 3:
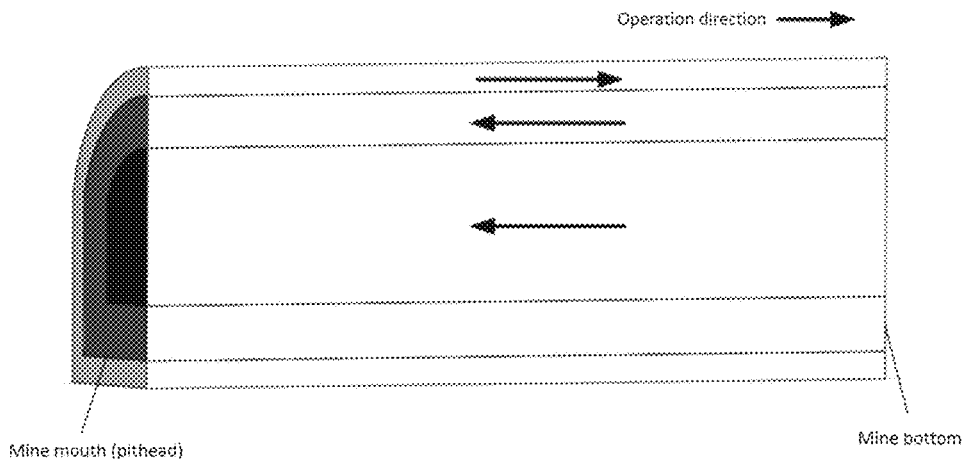
FIG. 3 is a schematic view illustrating a construction route in example 2.
Figure 4:
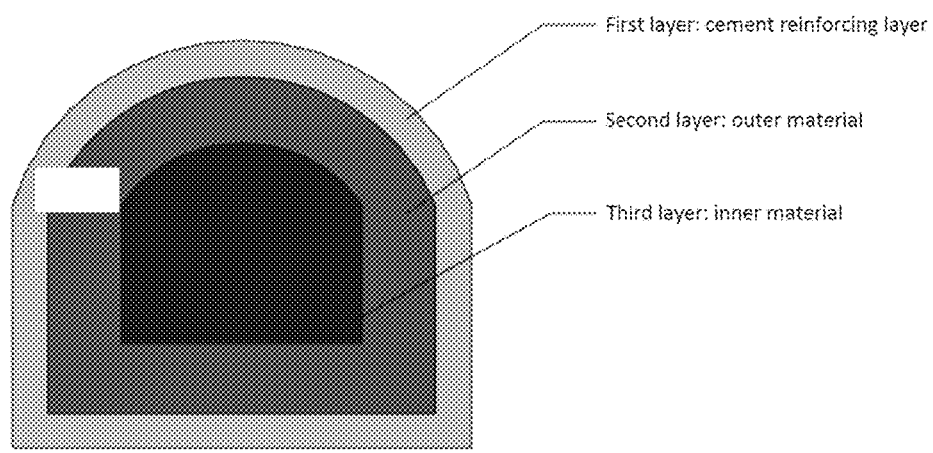
FIG. 4 is a schematic view illustrating a structure of filling layers in example 2.

(B) Arranging rebars and pouring a cement material onto the wall of the depleted coal mine in a direction from its mouth to its bottom. The outer material and the inner material obtained in said step (A) were then simultaneously filled into the depleted coal mine in a direction from the bottom to the mouth (as shown in FIG. 3) and compacted to obtain filling layers. Parameters associated with the filling layers were shown in Table 4, and a structure of the filling layers was shown in FIG. 4.

(C) Water was injected into the filler after compaction, a pore filling rate reached 60%, and the hydration lasted for 28 days.

(D) Carbon dioxide (with a purity of 90%) was injected into the filler after hydration under a constant pressure of 13 MPa, and the coal mine was then closed to mineralize the carbon dioxide. Carbon dioxide sequestration and reinforcement of the depleted coal mine were thus realized. The carbon dioxide was reinjected every 3 years during the mine closure.

Parameters associated with a simulated formation in this example were shown in Table 4.

A calculated total amount of the sequestrated carbon dioxide was 8.05 million tons. Details of the calculation were as follows.

(1) For the cement reinforcing layer (the porosity thereof was omitted)

$$M_{CO_2-1} = m_{cement} \times C\_\%THCO_2 = V \times \rho \times 0.8 \times C\_\%THCO_2 = 1 \times 2600 \times 0.8 \times 0.3773 = 784.8 \text{ kg}.$$

(2) For the outer material

A total sequestration amount of the carbon dioxide for the filler with a volume of 1 m$^3$ would now be calculated. A water saturation of the filler was 0.4.

An amount of the carbon dioxide solidified by the cement was:

$$m_c = m_{cement} \times C\_\%THCO_2 = V \times \rho \times 0.5 \times C\_\%THCO_2 = 1 \times 2000 \times 0.5 \times 0.3773 = 377.3 \text{ kg}.$$

An amount of the carbon dioxide solidified by the ash was:

$$m_a = m_{ash} \times A\_\%THCO_2 = V \times \rho \times 0.5 \times A\_\%THCO_2 = 1 \times 2000 \times 0.5 \times 0.0411 = 41.1 \text{ kg}.$$

An amount of the carbon dioxide dissolved in the water was:

$$m_d = m_{water} \times w\% = V_{water} \times \rho_{water} \times w\% = V \times \epsilon \times S_w \times \rho_{water} \times w\% = 1 \times 0.22 \times 0.4 \times 998.41 \times 0.0561 = 4.93 \text{ kg}.$$

An amount of the residual supercritical carbon dioxide was:

$$m_{sc} = V_{sc} \times \rho_{sc} = V \times \epsilon \times (1-S_w) \times \rho_{sc} = 1 \times 0.22 \times 0.6 \times 714.84 = 94.36 \text{ kg}.$$

Thus, the total sequestration amount of the carbon dioxide for the 1 m$^3$ outer material was:

$$M_{CO_2-2} = m_c + m_a + m_d + m_{sc} = 377.3 + 41.1 + 4.93 + 94.36 = 517.69 \text{ kg/m}^3.$$

(3) For the inner material

A total sequestration amount of the carbon dioxide for the inner material with a volume of 1 m$^3$ would now be calculated. A water saturation of the filler was 0.4. It was assumed that a theoretical amount of the carbon dioxide solidified by the architectural waste was J-%THCO$_2$=0.2, and a theoretical amount of the carbon dioxide solidified by the coal gangue M-%THCO$_2$=0.02.

An amount of the carbon dioxide solidified by the cement was:

$$m_c = m_{cement} \times C\_\%THCO_2 = V \times \rho \times 0.2 \times C\_\%THCO_2 = 1 \times 1400 \times 0.2 \times 0.3773 = 105.6 \text{ kg}.$$

An amount of the carbon dioxide solidified by the slag was:

$$m_a = m_{ash} \times A\_\%THCO_2 = V \times \rho \times 0.3 \times A\_\%THCO_2 = 1 \times 1400 \times 0.3 \times 0.0411 = 17.262 \text{ kg}.$$

An amount of the carbon dioxide solidified by the architectural waste was:

$$m_j = m_{jz} \times A\_\%THCO_2 = V \times \rho \times 0.3 \times J\_\%THCO_2 = 1 \times 1400 \times 0.3 \times 0.2 = 84 \text{ kg}$$

An amount of the carbon dioxide solidified by the coal gangue was:

$$m_m = m_{mg} \times M\_\%THCO_2 = V \times \rho \times 0.2 \times M\_\%THCO_2 = 1 \times 1400 \times 0.2 \times 0.02 = 5.6 \text{ kg}$$

An amount of the carbon dioxide dissolved in the water was:

$$m_d = m_{water} \times w\% = V_{water} \times \rho_{water} \times w\% = V \times \epsilon \times S_w \times \rho_{water} \times w\% = 1 \times 0.35 \times 0.4 \times 998.41 \times 0.0561 = 7.842 \text{ kg}.$$

An amount of the residual supercritical carbon dioxide was:

$$m_{sc} = V_{sc} \times \rho_{sc} = V \times \epsilon \times (1-S_w) \times \rho_{sc} = 1 \times 0.35 \times 0.6 \times 714.84 = 150.12 \text{ kg}.$$

Thus, the total sequestration amount of the carbon dioxide for the 1 m$^3$ inner material was:

$$M_{CO_2-3} = m_c + m_a + m_j + m_m + m_d m_{sc} = 105.6 + 17.262 + 84 + 5.6 + 7.842 + 150.12 = 370.424 \text{ kg/m}^3.$$

Thus, the total sequestration amount of the carbon dioxide was:

$$M = V \times (0.1 \times M_{CO_2-1} + 0.2 \times M_{CO_2-2} + 0.7 \times M_{CO_2-3})$$
$$= 2.2 \times 10^7 \times (0.1 \times 784.8 + 0.2 + 517.69 + 0.7 \times 370.424)$$
$$\div 1000 = 9.701 \times 10^6 \text{ t}.$$

TABLE 4

Parameters associated with filling layers

| Parameters | Porosity | Compressive Strength/MPa | Volume Fraction | Density/kg/m$^3$ |
|---|---|---|---|---|
| Cement reinforcing layer | <0.14 | >40 | 0.1 | 2600 |
| Outer material | 0.2-0.25 | >30 | 0.2 | 2000 |
| Inner material | 0.3-0.4 | 20-30 | 0.7 | 1400 |

EXAMPLE 3

Based on the Example 1, the water injected in said step (C) was replaced with alkaline wastewater with a pH of 12, and the others were not changed.

A strength of a simulated formation obtained in this example was 25 MPa.

A calculated theoretical total amount of the sequestrated carbon dioxide was 9.769 million tons. Details of the calculation were as follows.

A total solidification amount of the carbon dioxide for the filler with a volume of 1 m$^3$ would now be calculated. A water saturation of the filler was 0.4.

An amount of the carbon dioxide solidified by the cement was:

$$m_c = m_{cement} \times C\_\%THCO_2 = V \times \rho \times 0.4 \times C\_\%THCO_2 = 1 \times 1303.1 \times 0.4 \times 0.3773 = 196.66 \text{ kg}.$$

An amount of the carbon dioxide solidified by the slag was:

$$m_a = m_{ash} \times A\_\%THCO_2 = V \times \rho \times 0.6 \times A\_\%THCO_2 = 1 \times 1303.1 \times 0.6 \times 0.0411 = 32.13 \text{ kg.}$$

The pH value of the wastewater injected was 12 (concentration of $OH^-$ was 0.01 mol/L). Alkalis therein reacted in neutralization reactions with the injected carbon dioxide. A coefficient ratio of the alkalis to the carbon dioxide was 2:1. An amount of the carbon dioxide consumed was:

$$m_n = V \times \epsilon \times S_w \times c \div 2 \times 44 = 1 \times 0.39 \times 0.4 \times 0.01 \div 2 \times 44 = 0.0346 \text{ kg}$$

An amount of the carbon dioxide that was unreacted and still dissolved in the water was:

$$m_d = m_{water} \times w\% = V_{water} \times \rho_{water} \times w\% = V \times \epsilon \times S_w \times \rho_{water} \times w\% = 1 \times 0.393 \times 0.4 \times 998.41 \times 0.0561 = 8.805 \text{ kg.}$$

An amount of the residual supercritical carbon dioxide was:

$$m_{sc} = V_{sc} \times \rho_{sc} = V \times \epsilon \times (1-S_w) \times \rho_{sc} = 1 \times 0.393 \times 0.6 \times 714.84 = 168.56 \text{ kg.}$$

Thus, the total solidification amount of the carbon dioxide for the 1 m³ solid waste filler was:

$$M_{CO_2} = m_c + m_a + m_n + m_d + m_{sc} = 196.66 + 32.13 + 0.0346 + 8.805 + 168.56 = 406.1896 \text{ kg/m}^3.$$

(2) Calculation of a theoretical amount of the carbon dioxide sequestrated by the first layer—the cement reinforcing layer It was assumed that the mass fraction of the cement in the cement reinforcing layer was 80% (rebars were excluded and its porosity was also omitted), and the density thereof was 2600 kg/m³.

Then, the total solidification amount of the carbon dioxide for a 1 m³ cement reinforcing layer was:

$$m_c = m_{cement} \times C\_\%THCO_2 = V \times \rho \times 0.8 \times C\_\%THCO_2 = 1 \times 2600 \times 0.8 \times 0.3773 = 784.8 \text{ kg.}$$

The total sequestration amount of the carbon dioxide was:

$$M = V \times M_{CO_2} = (2.2 \times 10^7 \times 0.9 \times 406.1896 + 2.2 \times 10^7 0.1 \times 784.8) \div 1000 = 9.769 \times 10^6 \text{ t.}$$

It can be seen from the above examples that the process for treating waste from a pithead power plant of the invention solves the problem of carbon dioxide emission. The carbon dioxide produced by burning coal may be directly injected into a depleted coal mine after purification for sequestration, thereby reducing the cost of transportation of the carbon dioxide over long distances. The process of the present invention also solves the problem of the stacking of the solid waste (i.e., slag, ash, coal gangue and architectural waste in the area surrounding the power plant) from the pithead power plant, thereby saving land resources, protecting local lakes and rivers as well as groundwater, reducing local air pollution and thus protecting the healthy life of the local residents. The process of the invention further solves problems of collapse of the depleted coal mine, and water and soil loss, thereby protecting farmland of the local residents and thus life and property safety of the local residents.

The above description is only the preferred embodiments of the present invention, and is not intended to limit the present invention in any form. It should be noted that, for those skilled in the art, various improvements and modifications can be made without departing from the principle of the present invention and should be considered within the scope of the present invention.

What is claimed is:

1. A process for treating waste from a pithead power plant and sequestrating carbon dioxide discharged therefrom, comprising steps of:
    (A) mixing solid waste from the pithead power plant with cement and a mixing liquid to produce a mixed material;
    (B) filling the mixed material produced in step (A) into a depleted coal mine and performing a compaction operation;
    (C) injecting a hydrating liquid into the filler after compaction to cause hydration; and
    (D) injecting carbon dioxide discharged from the pithead power plant into the filler after hydration and then closing the mine to mineralize the carbon dioxide, thereby achieving carbon dioxide sequestration and reinforcement of the depleted coal mine.

2. The process of claim 1, wherein the solid waste in said step (A) comprises one or more of slag, ash, coal gangue, and architectural waste.

3. The process of claim 2, wherein, in step (A), a mass ratio of the solid waste to the cement is 3/1 to 2.

4. The process of claim 1, wherein, in said step (A), a mass ratio of the solid waste to the cement is 3/1 to 2.

5. The process of claim 4, wherein, in said step (A), a water-cement ratio of the mixed material is 0.2 to 0.25.

6. The process of claim 1, wherein a compaction pressure as used in said step (B) is 30 to 50 MPa.

7. The process of claim 6, wherein a porosity of the filler after compaction in said step (B) is 0.3 to 0.45.

8. The process of claim 1, wherein a porosity of the filler after compaction in said step (B) is 0.3 to 0.45.

9. The process of claim 8, wherein an injection amount of the hydrating liquid in said step (C) is 40% to 60% of a pore volume of the filler.

10. The process of claim 9, wherein a hydrating time in said step (C) is 25 to 35 days.

11. The process of claim 1, wherein a hydrating time in said step (C) is 25 to 35 days.

12. The process of claim 1, wherein, in said step (D), the carbon dioxide is injected under a constant pressure.

13. The process of claim 12, wherein, in said step (D), the carbon dioxide is reinjected every 3 to 5 years during the mine closure.

14. The process of claim 1, wherein, in said step (D), the carbon dioxide is reinjected every 3 to 5 years during the mine closure.

* * * * *